Figure 1:
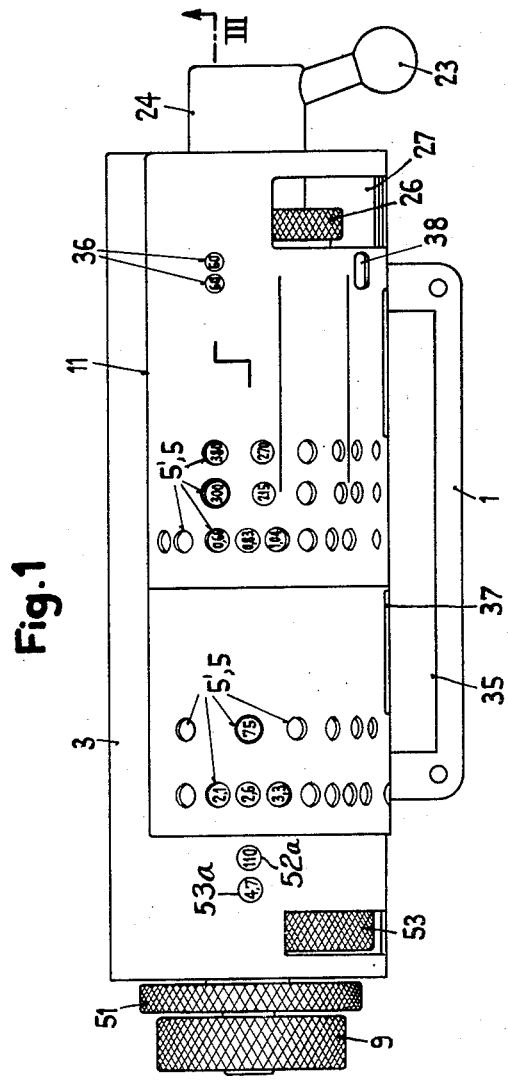

June 26, 1951 R. EGLI 2,558,646
CALCULATOR FOR DETERMINING MAXIMUM CUTTING
SPEEDS OF MACHINE TOOLS
Filed Nov. 17, 1948 4 Sheets-Sheet 1

Inventor
Rudolf Egli
By
Linger, Ekbert, Stern
& Carlberg, Attys

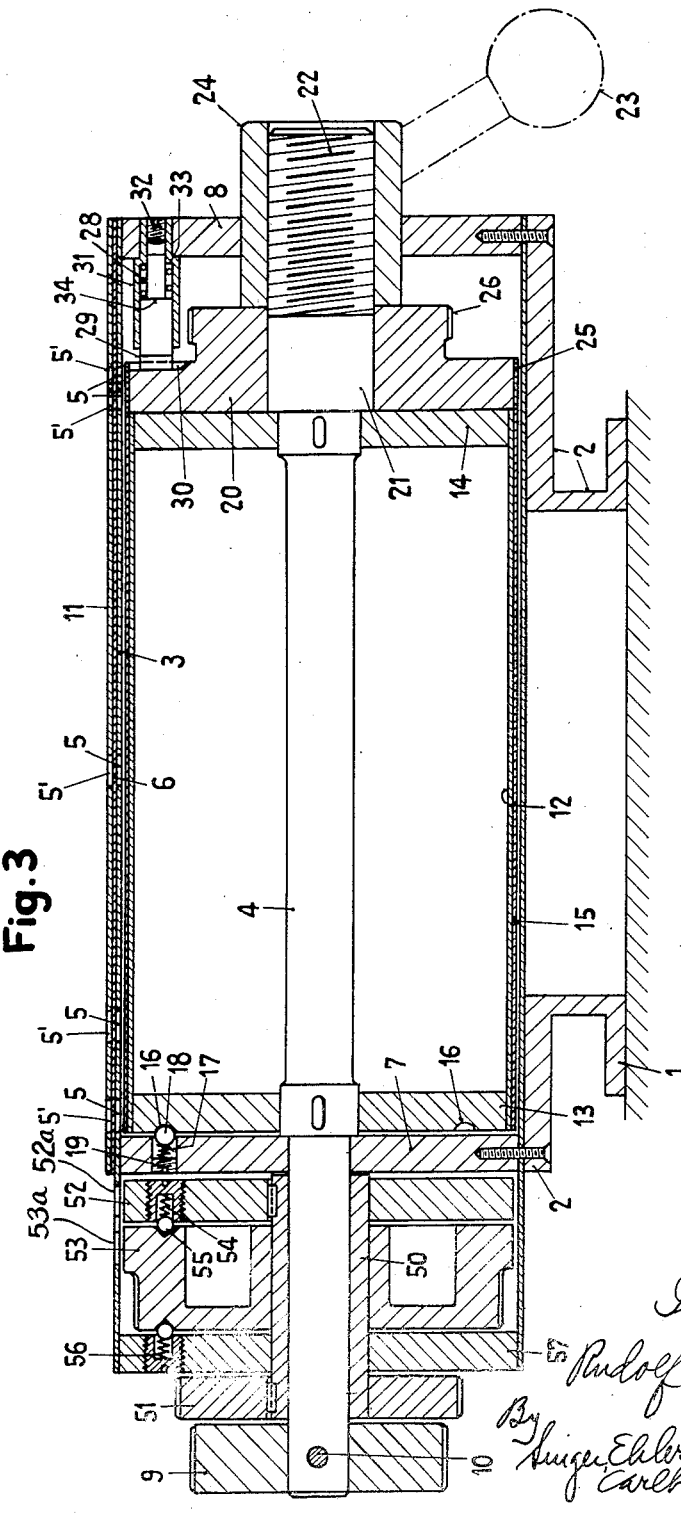

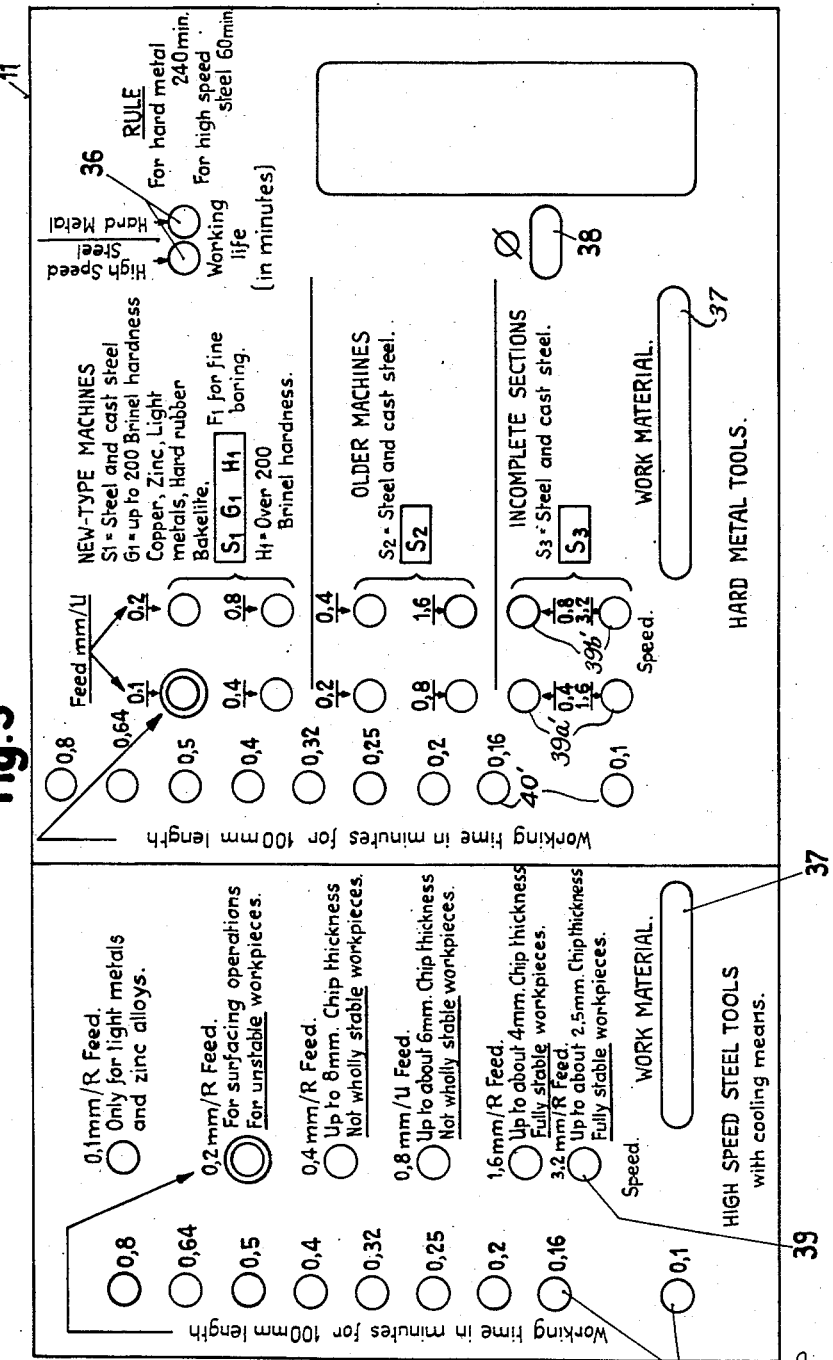

June 26, 1951  R. EGLI  2,558,646
CALCULATOR FOR DETERMINING MAXIMUM CUTTING
SPEEDS OF MACHINE TOOLS
Filed Nov. 17, 1948  4 Sheets-Sheet 4

Fig. 6

| | A | | | | B | | | | | | | | | | | | | | | | |
|---|---|---|---|---|---|---|---|---|---|---|---|---|---|---|---|---|---|---|---|---|---|
| 480 | 400 | 360 | 240 | 60 | 60 | 10 | 12 | 14 | 16 | 18 | 20 | 22 | 25 | 180 | 200 | 225 | 250 | 280 | 320 | 360 | 400 | 450 | 500 | 560 | 640 | 720 | 800 | 900 | 1000 |

25

Fig. 4

| 2,3 | 64 | Cast Steel | 30-50 kg | 54 | 0,74 | 270 | 335 | St. 70.11 (70-85 kg) | 170 |
| --- | --- | --- | --- | --- | --- | --- | --- | --- | --- |
| 2,6 | 75 | St. 50.11 | 50-60 kg | 48 | 0,83 | 240 | 300 | Alloy Steel (70-85 kg) | 150 |
| 3,0 | 67 | St. 60.11 | 60-70 kg | 42 | 0,93 | 215 | 270 | St. 85 (85-100 kg) | 140 |

41 — 42 — 43 — 44 — 41' — 42a — 42'b — 43' — 44'

15

Fig. 7

| WORK CALCULATOR for rational operation. | | Work life of tool. | | |
|---|---|---|---|---|
| | | 60 Min | 240 Min | 430 Min |
| Method of use. | H.S.S. | All normal work | Long runs. Special Auto stel on Autos. Work with form tools. | Very long runs. Auto work with non-auto mtls. Multi spindle autos. |
| 1. Free handle. 2. With knob ㉖ adjust working life. 3. With knob ⑨ select work material. 4. Fasten handle. 5. With knob ⑨ adjust to workpiece diameter. 6. Read off result figures. | Hard mtl. | Surfacing work | All normal work. | Long runs. Turret autos and multi tool lathes. Work with form tools. |

35

Inventor
Rudolf Egli
By Linger Elbert Horn &
Carlberg, attys

Patented June 26, 1951

2,558,646

UNITED STATES PATENT OFFICE 2,558,646

CALCULATOR FOR DETERMINING MAXIMUM CUTTING SPEEDS OF MACHINE TOOLS

Rudolf Egli, Zurich, Switzerland, assignor of one-half to Reuge & Cie, Vaud, Switzerland, a firm Application November 17, 1948, Serial No. 60,566
In Switzerland December 2, 1947

2 Claims. (Cl. 235—61)

The present invention relates to calculating apparatus especially for determining the most economical working speeds and relevant times on machine tools such as lathes, drilling machines, borers, milling machines and the like operating by chip removal.

Heretofore the values relevant for an economical chip removal procedure that is speed, feed and chip thickness (which three values will hereinafter be referred to together as "working conditions") and the working times dependent thereon were calculated by means of extensive collected working preparation and calculation information in tabular or book form with the help of calculating discs, nomograms, diagrams or other helping means. This requires on the one hand, collection and assembly of work-information and which on the other hand must be brought into useful form by technically skilled personnel by means of auxiliary calculating apparatus.

The basis for correct machine operation and therefore of the cutting operating in itself, that is the collection of these papers relating to the most economical working and calculating information were determined from workshop experience and the results of experiments on chip removal. Exact natural basic laws have not heretofore been discovered. The effects of the various influences and their inter-relation can for the most part only be determined by practical experiments, for which purpose also only empirical basic laws can be determined. One can therefore only speak of mathematical laws so far as one has found the conditions or influences under the same or similar assumptions and these must always be found in advance.

The conditions so found comprise for the most part those dependent on the working conditions (speed, feed and chip thickness) which occur under the same or similar assumptions. The knowledge of these conditions and effects and their expression in the form of a law, which lead to an economical employment of the tool and machine and their interdependence on the operating conditions, is well known to the research engineer and specialist, but in the workshop or factory they are known only incompletely or at most only by special study for each special application.

The object of the present invention is to provide an apparatus which by simple adjustment of certain or desired values automatically shows the most economical working conditions on the basis of the above-mentioned laws. Furthermore the apparatus also shows the appertaining machine times in directly visible form.

For various chip-forming types of work for example for turning, boring, milling and the like the construction of the apparatus is in principle the same. Only the actual text and tabular values vary in each case according to the magnitudes to be dealt with in the apparatus.

Figure 2:
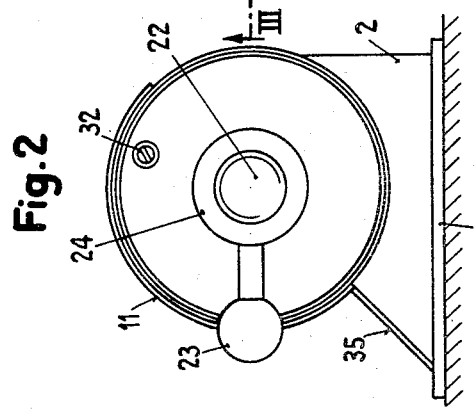

The accompanying drawings illustrate one constructive embodiment of the invention for chip-removing work operations, in the present case turning, in which:

Fig. 1 is a plan view,
Fig. 2 a side view,
Fig. 3 a longitudinal section on line III—III, Fig. 1,
Fig. 4 a section of the table applied to the large roller,
Fig. 5 a view of the screen applied to the casing,
Fig. 6 a view of the table on the small roller, and
Fig. 7 shows the instruction card with the necessary instructions.

In the constructional embodiment shown on the drawing, 1 is the base plate on which rests a cylindrical housing 3 by means of two end plates 2, which housing is concentric with the spindle 4 and is provided with numerous window apertures 5 of which the arrangement and purpose will be further explained below. Over part of the outer wall of the casing 3 is disposed a layer 6 of transparent material which prevents the entry of dust and dirt through the windows 5 into the inside of the casing 3. Over the layer 6 is a screen 11 provided with window 5' corresponding to the windows 5 and embodies instructional matter as shown on Fig. 5. On the end faces of the housing 3 are the circular end plates 7, 8 in which the spindle 4 is rotatably mounted. The left hand end (Fig. 3) of the spindle 4 carries the knurled adjusting ring 9 which is secured to the spindle 4 by means of a pin 10. Within the casing 3 and immediately to the right (Fig. 3) against the plate 7, is the large roller 12 which is supported on the spindle 4 by means of the discs 13, 14. The roller 12 which carries a table 15 (Figs. 3 and 4) is fixed to the spindle 4 so that by adjustment of the adjusting ring 9 the large roller 12 rotates with it whereby the figures of the table 15 can be seen through the windows 5, 5'.

Notches 16 are provided on the outer side of the disc 13, which cooperate with a ball 18 pressed by spring 17 located under compression between the ball 18 and the screw 19 fixed in the plate 7. Immediately to the right (Fig. 3) against the disc 14 is the small roller 20 which is freely rotatable on the part 21 of the spindle 4, of which the right hand is threaded at 22. A sleeve 24 with hand grip 23 screws on the latter and is freely rotatable in the plate 8.

As is immediately apparent from Fig. 3, by screwing down the sleeve 24 on the thread 22 the small roller 20 is pressed against the disc 14 so that it is operated with the latter. If on the other hand the sleeve 24 is screwed to the right (Fig. 3) the rollers 12, 20 can rotate independently. The roller 20 also carries on its peripheral part, which is of the same diameter as the large roller 12, a table 25 which is shown developed in Fig. 6 and of which the figures are readable through the windows 5, 5' of the housing 3 and through the screen 11. The roller 20 is provided with a knurled adjustment flange 26 which is accessible through an opening 27 in the housing 3 (Fig. 1).

A bolt 29 actuated by spring 28 is adapted to cooperate with the small roller, being engageable with notches 30 in the roller. The bolt 29 is located in a sleeve 31 let into the plate 8 and closed from the outside by means of a screw 32. The sleeve 31 embodies a shoulder surface 33 against which one end of the spring 28 bears while its other end presses against the shoulder surface 34 of the bolt 29. The loading of the small roller 20 by the bolt 29 is however more powerful than that of the large roller 12 by the spring loaded ball 18 which also acts as a bolt. It is therefore possible, with the clamping sleeve 24 free, for the large roller 12 to be rotated by the adjusting ring 9 while the small roller 20 remains at rest by the action of the bolt 29 thereon; if however the two rollers 12, 20 are coupled together by action on the clamping sleeve 24, the two rollers can be rotated together while overcoming the spring action of the bolt 29. The distribution of the notches 16 corresponds with that of the table 15 Fig. 4 and the ball 18 ensures spacing always correctly under the windows of the housing 3 and of the screen 11. The small roller 20 can also be fixed in definite positions by the notches 29 so that the two rollers can be rotated independently and can be coupled in predetermined positions by the clamping sleeve 24 and then together rotated over the windows in the casing 3 and of the screen 11.

Two calculating discs 52, 53 are mounted on the sleeve 50 which is rotatable on the spindle 4. The discs are rotatably adjustable by a ring 51 in such a manner that a spring detent 54 of the disc 52 which is keyed to the sleeve 50 enters recesses 55 of the disc 53 which is rotatable on the sleeve 50. The disc 53 is also subject to the influence of detents 56 engaging the housing wall 57. The detents 56 are weaker than the spring detent 54. The discs 52, 53 are used in the usual way as calculating discs provided with logarithmic scales, in such manner that disc 52 indicates the length of the workpiece in millimeters in window 52a while the disc 53 is adjusted to the working time per unit of length (minute per 100 millimeters) readable through windows 53a. By simultaneous rotation of the two discs 52, 53 relatively to a window of the housing the time required to work on workpieces of different length can be read off.

Before the method of operation of the described apparatus is further explained reference will be briefly made to the information set out on the tables 15, 25. The first, shown in partial development in Fig. 4, embodies the column 41 for the running time in minutes for each 100 millimeter length of workpiece, the column 42 showing the speed in revolutions per minute, the column 43 indicates the type of metal to be operated upon and the column 44 indicates the cutting speed for high speed steel tools. The reading of these values is effected through the windows 40, 39 and 37, that is through the three left hand windows (Fig. 5) of the casing. Corresponding information is given in the columns 41', 42'a, 42'b, 43' and 44' for hard metal tools and are readable through the series of windows 40', 39'a, 39'b and 37' provided on the right hand side of the screen 11.

On the table 25 shown in development in Fig. 6 the section A contains the working life of the lathe tool and section B contains the workpiece diameters. These values are readable through the windows 36, 38 (Fig. 5).

The values on the tables show always "standard" numbers, as established in industry, with definite incremental steps. As is known the products and quotients of standard numbers and also their powers are still standard numbers which can be determined without calculation, that is by reading from the table. The values of the standard numbers are distributed on the two rollers 15 and 25 with an incremental progression which fulfills requirements and are arranged as required in relation to the adjustment or reading windows. By adjusting the rollers relatively and then coupling them and moving them together to a desired reading point (window), a very large table is reduced in simple manner to the smallest possible dimensions.

A determination of the most economical operating conditions with the present apparatus, by way of example for turning, will now be carried out.

1. The operating lever 23 is released whereby the two rollers 12 and 20 can be rotated independently.

2. The small roller 20 is rotated by the flange 26 and the desired working life of the lathe tool in the section A of the table 25 shown in Fig. 6, is set in the appropriate window 36, Fig. 5, whereupon this position is fixed by the bolt 29.

3. The large roller 12 is adjusted by the knob 9 and the work material to be treated is selected so that it comes beneath the window 37 (Fig. 5). This position is fixed by the catch 18 without the position of the small roller 20 being altered since as already explained the spring 28 is stronger than the spring 17.

4. Thereupon the handle 23 is operated to couple the two rollers 12, 20 together.

5. By the adjusting ring 9 the workpiece diameter is set, this diameter being shown in section B of the table 25 (Fig. 6), below the appropriate window 38 (Fig. 5). Since both rollers are coupled together and rotate as one the desired value may now be read off; when a hard metal turning tool is used, the right hand section (Fig. 5) is employed, and if a high speed steel tool is used, the reading is obtained on the left hand side of the apparatus under the corresponding window 5'.

If for example operation is with speed steel, the most economical rotational speed comes under the row of windows 39 marked "rotary speed" whereupon according to the method of working the corresponding window is selected and the relevant feed and the maximum permissible depth of cut is read against this window.

This most economical working condition read off on the scale (working speed) guarantees a working-life to the cutting tool (time until the edge of the tool must be again ground) as selected from the beginning; that is such as has been selected by previous experience (see the introduction to the diagram Fig. 7).

Simultaneously the machining time can be read from the window 40 as shown in Fig. 5. This time applies for a workpiece of 100 mm. length. If the workpiece is of a different length the actual time is indicated directly by the multiplication device 52, 53.

My invention accomplishes the economical and rapid determination of the desired working conditions for chip removing operations. It is clear that the embodiment described herein may be modified or varied without departing from the scope of my invention and I wish, therefore, to define my invention only by the following claims.

What I claim is:

1. A calculating machine comprising a cylindrical housing having a plurality of openings in its circumference and having closed ends, a shaft rotatably mounted within said housing with its ends extending exteriorly of said housing, a drum fixed to said shaft within said housing and having a chart on its circumference viewable through certain of said openings, a roller rotatably mounted on said shaft within said housing adjacent said drum and having markings on its circumference viewable through other of said openings, said shaft being provided with an adjusting ring for rotating said drum, said housing being slotted to expose a portion of said roller for rotation thereof, spring detent means between one end of said housing and said drum for releasably holding said drum in one of a plurality of positions wherein portions of said chart are aligned with said openings, spring detent means between the other end wall of said housing and said roller for releasably holding said roller in one of a plurality of positions, and a sleeve screw threadedly mounted on said shaft adjacent said roller and movable with respect to said shaft to axially move said roller into locking contact with said drum whereby said drum and said roller are rotatable as a unit.

2. A calculating machine comprising, a stationarily mounted cylinder having a plurality of openings in its circumference, a shaft rotatably mounted axially within said cylinder, a drum fixed to said shaft having markings on its circumference viewable through said openings, a roller rotatably mounted on said shaft adjacent said drum and having markings on its circumference viewable through said openings, spring detent means associated with said drum and said cylinder and with said roller and said cylinder to releasably hold said drum and said roller respectively in one of a plurality of positions wherein certain of said markings align with said openings, means for rotating said shaft and said drum independently of said roller, said roller having an integral flange for rotating said roller independently of said drum, said cylinder being slotted to expose said flange, said shaft being threaded at the end thereof adjacent said roller, and a sleeve threaded on said shaft and movable with respect thereto to clamp said roller to said drum whereby said drum and said roller rotate as a unit.

RUDOLF EGLI.

REFERENCES CITED

The following references are of record in the file of this patent:

UNITED STATES PATENTS

| Number | Name | Date |
| --- | --- | --- |
| 823,426 | Meilicke | June 12, 1906 |
| 1,278,315 | Drake | Sept. 10, 1918 |
| 1,400,363 | Kennedy et al. | Dec. 13, 1921 |
| 1,973,192 | Woodbury | Sept. 11, 1934 |
| 2,293,175 | Ruhl et al. | Aug. 18, 1942 |